(12) United States Patent
Seck et al.

(10) Patent No.: US 12,483,587 B2
(45) Date of Patent: Nov. 25, 2025

(54) AUTOMATED VULNERABILITY EXCEPTION PROCESS

(71) Applicant: Capital One Services, LLC, McLean, VA (US)

(72) Inventors: Mohamed Seck, Aubrey, TX (US); Sesha Sowmya Nadiminti, Glen Allen, VA (US); Krystan R. Franzen, Mechanicsville, VA (US); Grant Michael Iwan, Montpelier, VA (US); Shannon Reid, Richmond, VA (US)

(73) Assignee: Capital One Services, LLC, McLean, VA (US)

(*) Notice: Subject to any disclaimer, the term of this patent is extended or adjusted under 35 U.S.C. 154(b) by 80 days.

(21) Appl. No.: 18/604,262

(22) Filed: Mar. 13, 2024

(65) Prior Publication Data

US 2025/0294046 A1    Sep. 18, 2025

(51) Int. Cl.
    *H04L 9/40*    (2022.01)
(52) U.S. Cl.
    CPC .............................. *H04L 63/1433* (2013.01)
(58) Field of Classification Search
    CPC .................................................. H04L 63/1433
    See application file for complete search history.

(56) References Cited

U.S. PATENT DOCUMENTS

| 10,708,292 | B2* | 7/2020 | Gerrick | G06F 21/562 |
| 11,509,677 | B2* | 11/2022 | Yadav | H04L 63/1433 |
| 12,368,745 | B1* | 7/2025 | Guo | H04L 67/306 |
| 2019/0245881 | A1* | 8/2019 | Ward | H04L 63/1433 |
| 2020/0236129 | A1* | 7/2020 | Barkovic | H04L 43/045 |
| 2020/0372154 | A1* | 11/2020 | Bacher | G06F 16/1834 |
| 2023/0308472 | A1* | 9/2023 | Boyer | G06F 40/40 |
| 2024/0073234 | A1* | 2/2024 | Hulick, Jr. | G06F 21/552 |
| 2024/0414190 | A1* | 12/2024 | Lal | G06F 40/58 |

FOREIGN PATENT DOCUMENTS

| CN | 107204869 | B | * | 7/2020 | ........ | H04L 63/1433 |
| CN | 113923037 | A | * | 1/2022 | ........ | H04L 41/0631 |
| CN | 115130111 | A | * | 9/2022 | ........... | G06F 21/577 |
| CN | 116112259 | A | * | 5/2023 | ........ | H04L 63/1433 |
| CN | 118054939 | A | * | 5/2024 | ............. | G06N 20/00 |
| CN | 119011244 | A | * | 11/2024 | ............. | G06N 3/084 |
| CN | 119420559 | A | * | 2/2025 | ............ | H04L 63/20 |
| JP | 2005135239 | A | * | 5/2005 | | |
| WO | WO-2022096574 | A1 | * | 5/2022 | ............. | G06F 21/54 |

* cited by examiner

*Primary Examiner* — Sarah Su
(74) *Attorney, Agent, or Firm* — Harrity & Harrity, LLP

(57) ABSTRACT

In some implementations, an exception system may receive an indication of a security vulnerability associated with a cloud environment. The exception system may provide a data structure that represents the security vulnerability to a machine learning model in order to receive a suggested exception justification. The exception system may output, to a user device associated with a user assigned to the security vulnerability, a draft exception request that includes the suggested exception justification. The exception system may receive, from the user device, a request to submit an exception request based on the draft exception request. The exception system may transmit a command to tag the security vulnerability as excepted.

20 Claims, 14 Drawing Sheets

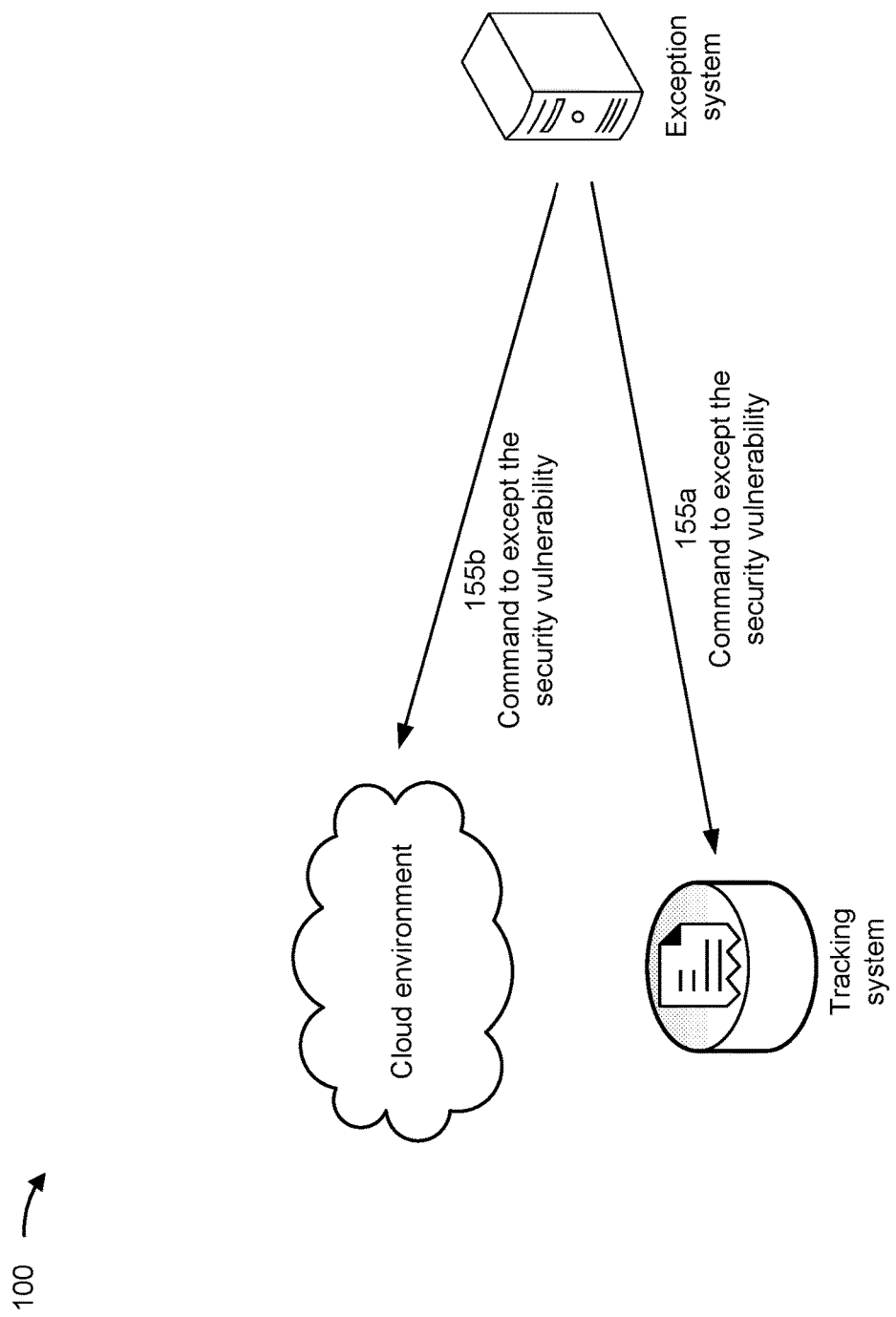

| Model | |
|---|---|
| Model Score & Decision | |
| 265 — Risk Assessment: | Low |
| 270 — Model Score: | 80/100 |
| Risk Override: | None |
| 275 — Adjusted Model Score: | 80/100 |
| Model Statement | |
| Model Statement: | Low-risk exception |
| 280 — Model Statement Description: | Risk satisfies low threshold (<70 score) |

FIG. 2C

AUTOMATED VULNERABILITY EXCEPTION PROCESS

BACKGROUND

Security vulnerabilities may arise when cloud-based applications are due for security patches or other software updates. Similarly, vulnerabilities may arise when cloud-based images (that may, for example, be used to create cloud instances) are not refreshed (e.g., by having instances based on those images rebooted, rehydrated, or otherwise reestablished).

SUMMARY

Some implementations described herein relate to a system for automating a vulnerability exception process. The system may include one or more memories and one or more processors communicatively coupled to the one or more memories. The one or more processors may be configured to receive an indication of a security vulnerability associated with a cloud environment. The one or more processors may be configured to provide a data structure, representing the security vulnerability, to a machine learning model in order to receive a suggested exception justification. The one or more processors may be configured to output a draft exception request, including the suggested exception justification, to a user associated with the security vulnerability. The one or more processors may be configured to receive a request to submit an exception request based on the draft exception request. The one or more processors may be configured to receive, from the machine learning model, a list of repeat offenders. The one or more processors may be configured to output the exception request, with the list of repeat offenders, to an administrator associated with the security vulnerability. The one or more processors may be configured to receive an approval of the exception request. The one or more processors may be configured to transmit a command, in response to the approval, to tag the security vulnerability as excepted.

Some implementations described herein relate to a method of automating a vulnerability exception process. The method may include receiving, at an exception system, an indication of a security vulnerability associated with a cloud environment. The method may include providing, by the exception system, a data structure that represents the security vulnerability to a machine learning model in order to receive a suggested exception justification. The method may include outputting, to a user device associated with a user assigned to the security vulnerability, a draft exception request that includes the suggested exception justification. The method may include receiving, from the user device and at the exception system, a request to submit an exception request based on the draft exception request. The method may include transmitting, by the exception system, a command to tag the security vulnerability as excepted.

Some implementations described herein relate to a non-transitory computer-readable medium that stores a set of instructions for user interfaces (UIs) for a vulnerability exception process. The set of instructions, when executed by one or more processors of a device, may cause the device to receive instructions for a UI including: an exception request, indicating at least one requestor and a justification, associated with a security vulnerability; a list of repeat offenders; a risk score associated with excepting the security vulnerability; and at least one indication of at least one related security vulnerability. The set of instructions, when executed by one or more processors of the device, may cause the device to receive an indication of an interaction with the UI. The set of instructions, when executed by one or more processors of the device, may cause the device to transmit a command to except the security vulnerability in response to the interaction.

BRIEF DESCRIPTION OF THE DRAWINGS

FIGS. 1A-1F are diagrams of an example implementation relating to an automated vulnerability exception process, in accordance with some embodiments of the present disclosure.

FIGS. 2A-2D are diagrams of example UIs relating to an automated vulnerability exception process, in accordance with some embodiments of the present disclosure.

DETAILED DESCRIPTION

Figure 1A:
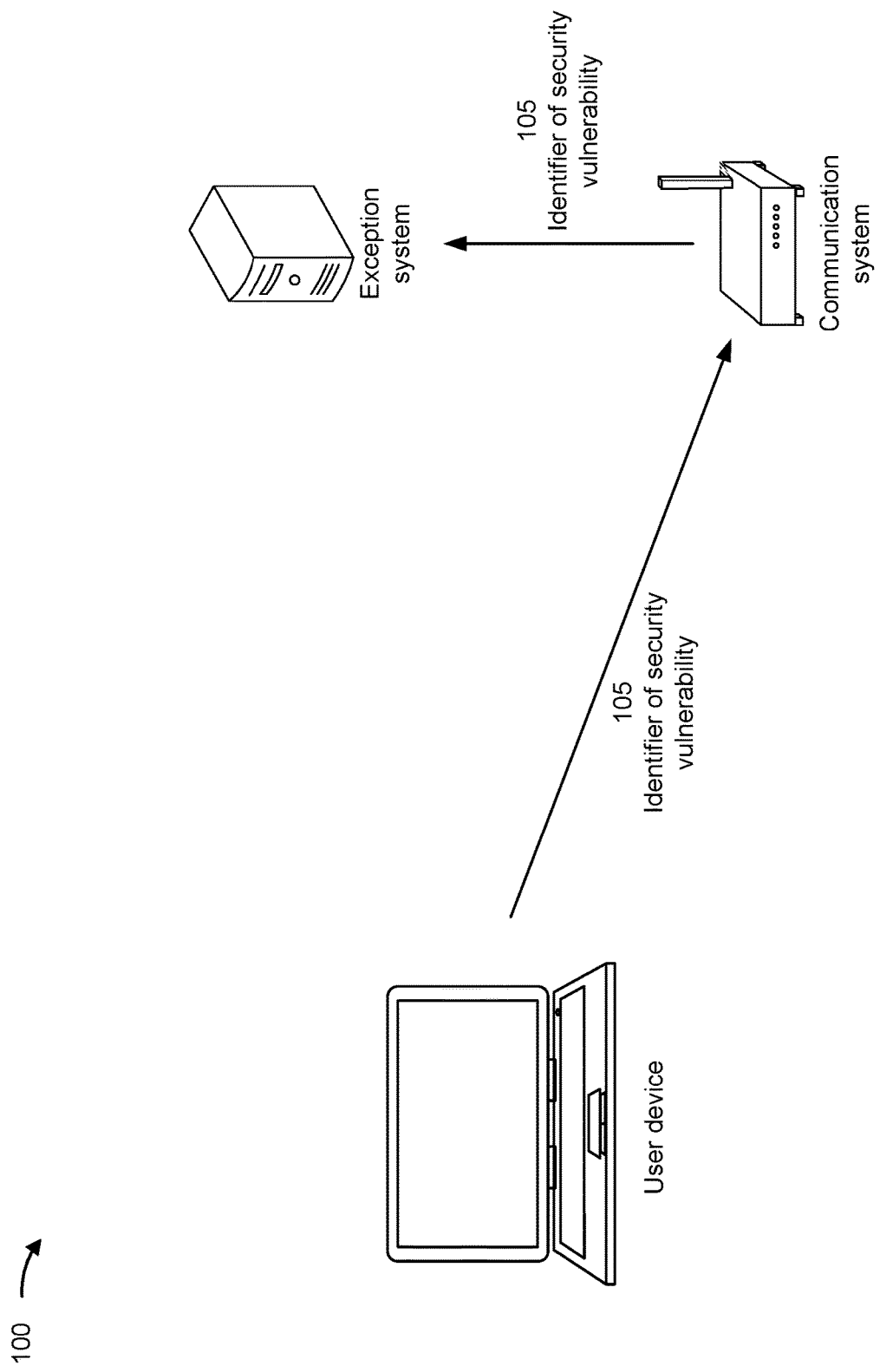

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when the cloud-based applications are due for security patches or other software updates. Similarly, cloud-based applications may experience vulnerabilities when corresponding cloud-based images (used, for example, to create cloud instances) are not periodically refreshed (e.g., by having instances based on those images rebooted, rehydrated, or otherwise reestablished). When cloud-based images are not refreshed, they may be referred to as "stale" and cloud-based applications relying on the images may be more susceptible to cyberattacks.

Some security vulnerabilities are more difficult to resolve than others. For example, a security vulnerability may require a software patch that has not yet been released. In another example, a security vulnerability may be resolved by a software update that will significantly increase downtime for multiple cloud applications. In order to manage difficult security vulnerabilities, an organization may implement a unified technology exceptions program (UTEP). Any security vulnerabilities approved through the UTEP may have longer deadlines and lower priority than non-excepted security vulnerabilities.

However, when a user submits a security vulnerability for the UTEP (e.g., via a user device), the submission consumes power and processing resources at the user device. Additionally, an administrator then reviews and signs off on an exception for the security vulnerability, which consumes power and processing resources at an administrator device. Finally, some users may abuse the UTEP process and submit security vulnerabilities for exceptions that are not good candidates for exceptions. As a result, security is decreased because security vulnerabilities that could have (and should have) been resolved persist for more time after being excepted.

Some implementations described herein enable a machine learning model to generate a draft exception request for a security vulnerability. A user may submit an exception request for the security vulnerability based on the draft exception request. As a result, a user device of the user consumes less power and fewer processing resources than if the user were to have generated the exception request without a draft provided by the machine learning model. Additionally, some implementations described herein enable a machine learning model to generate a risk score and/or an indication of related security vulnerabilities based on an exception request for a security vulnerability. An administrator may therefore evaluate the exception request using the risk score and/or the indication of related security vulnerabilities. As a result, an administrator device of the administrator consumes less power and fewer processing resources than if the administrator were to have evaluated the exception request without the risk score and/or the indication of related security vulnerabilities. Additionally, or alternatively, some implementations described herein enable the machine learning model to generate a list of repeat offenders for exception requests. An administrator may therefore reject exception requests based on the list of repeat offenders. As a result, security is improved because security vulnerabilities that can (and should be) resolved are not excepted.

FIGS. 1A-1F are diagrams of an example 100 associated with an automated vulnerability exception process. As shown in FIGS. 1A-1F, example 100 includes a user device, a communication system, an exception system, a tracking system, a cloud environment, a machine learning (ML) model (e.g., provided by an ML host), and an administrator device. These devices are described in more detail in connection with FIGS. 3 and 4.

The exception system may receive an indication of a security vulnerability associated with a cloud environment. For example, as shown in FIG. 1A and by reference number 105, the user device may transmit, and the exception system may receive, an identifier associated with the security vulnerability. The identifier may include an alphanumeric identifier that is uniquely (or at least quasi-uniquely, relative to the exception system) associated with the security vulnerability. Therefore, the indication of the security vulnerability may be the identifier associated with the security vulnerability. As further shown by reference number 105, the user device may transmit, and the exception system may receive, the identifier via the communication system. For example, the user device may transmit a message (e.g., a chat message or an email message, among other examples) that includes the identifier using the communication system, and the communication system may automatically transmit the identifier to the exception system. The user device may address the message to another user (e.g., at least one other user) of the communication system, and a bot (e.g., an automated script and/or a background application, among other examples) may detect the identifier in the message and transmit the identifier to the exception system. Alternatively, the user device may address the message to an account associated with the exception system. The communication system may include a server, such as an application server, a client server, a web server, a database server, a host server, a proxy server, a virtual server (e.g., executing on computing hardware), or a server in a cloud computing system, that provides messaging services (e.g., a Slack® server or another similar type of device), telecommunications services (e.g., a cell tower or another similar type of device), and/or email services (e.g., a Microsoft® server, a Google® server, or another similar type of device). Although the example 100 shows the communication system as separate from the exception system, other examples may include the communication system at least partially integrated (e.g., virtually, logically, and/or physically) with the exception system.

In some implementations, a user of the user device may provide input that triggers the user device to transmit the indication of the security vulnerability. For example, a web browser (and/or another type of application executed by the user device) may navigate to a website controlled by (or at least associated with) the communication system. Accordingly, the user may interact with a user interface (UI) representing the website in order to provide the input to trigger the user device to transmit the indication of the security vulnerability to the communication system.

Although the example 100 is described in connection with the user device transmitting the indication via the communication system, other examples may include the user device transmitting the indication directly to the exception system. For example, a web browser (and/or another type of application executed by the user device) may navigate to a website controlled by (or at least associated with) the exception system. Accordingly, the user may interact with a UI representing the website in order to provide the input to trigger the user device to transmit the indication of the security vulnerability to the exception system.

Figure 1B:
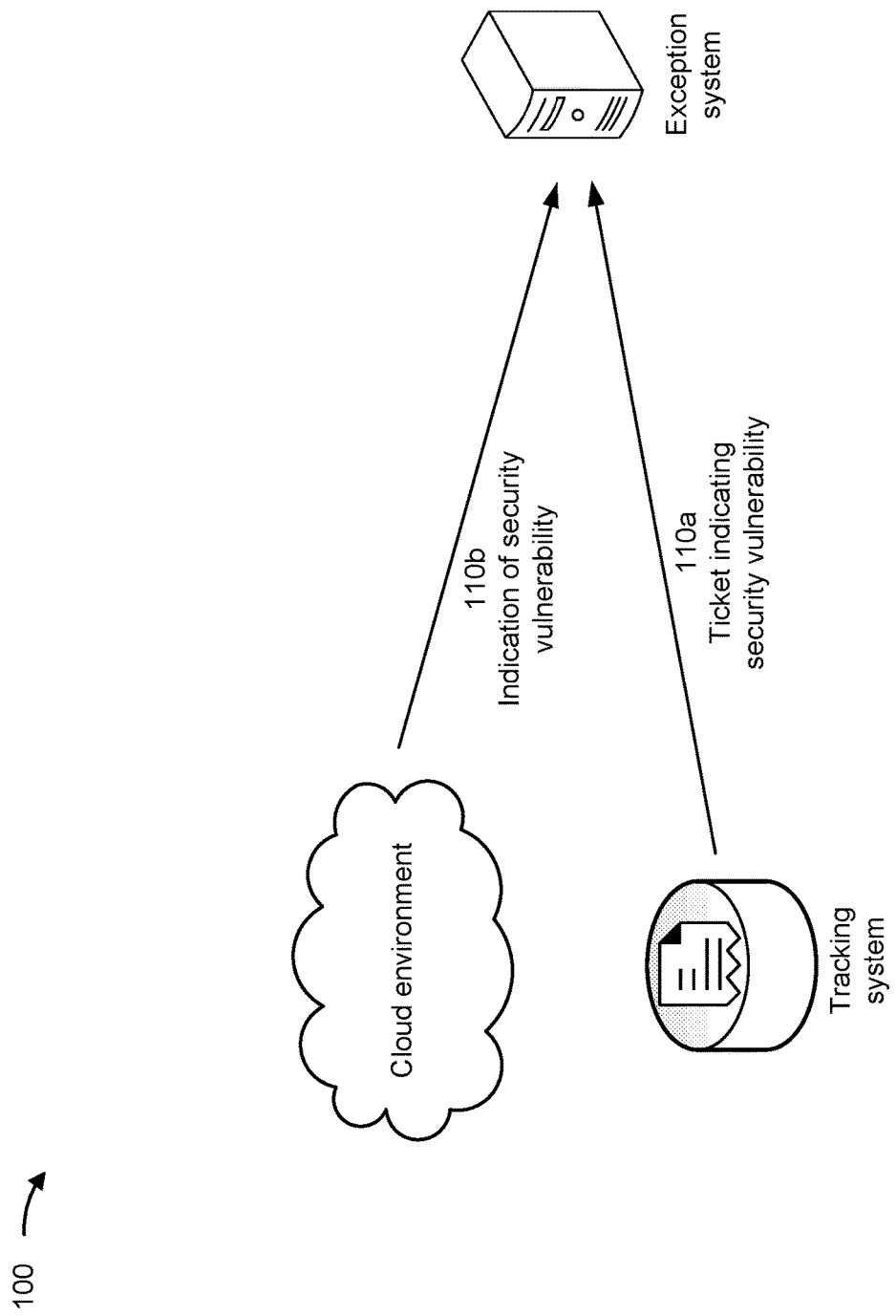

Additionally, or alternatively, as shown in FIG. 1B and by reference number 110a, the tracking system may transmit, and the exception system may receive, a ticket including the indication of the security vulnerability associated with the cloud environment. In some implementations, the tracking system may transmit, and the exception system may receive, a data structure that represents the ticket. The ticket may be generated in response to detection of the security vulnerability (e.g., automatically or by an administrator). Alternatively, the ticket may be generated as a reminder to remediate the security vulnerabilities (e.g., automatically or by an administrator). The ticket may, in some implementations, indicate a corresponding due date and/or a corresponding severity level for the security vulnerability.

In some implementations, the exception system may transmit, and the tracking system may receive, a request for the ticket. For example, the request may include a hypertext transfer protocol (HTTP) request, a file transfer protocol (FTP) request, and/or an application programming interface (API) call, among other examples. The request may include (e.g., in a header and/or as an argument) an indication of the security vulnerability and/or an indication of a cloud-based application associated with the security vulnerability. Accordingly, the tracking system may transmit the ticket in response to the request. The exception system may transmit the request according to a schedule (e.g., once per hour or once per day, among other examples) and/or in response to a command to transmit the request. For example, the user device may transmit, and the exception system may receive, the command, such that the exception system transmits the request in response to the command.

Additionally, or alternatively, the exception system may subscribe to ticket updates from the tracking system. Accordingly, the tracking system may transmit tickets according to a schedule (e.g., once per hour or once per day, among other examples) and/or as available (e.g., shortly after the ticket is created).

Additionally, or alternatively, as shown by reference number 110b, the cloud environment may transmit, and the exception system may receive, the indication of the security vulnerability associated with the cloud environment. In some implementations, the indication may include a name (e.g., a string value). Additionally, or alternatively, the indication may include a corresponding due date (e.g., determined by the cloud environment). The due date may include a date or a datetime by which remediation of the security vulnerability is expected. Additionally, or alternatively, the indication may include a corresponding severity level (e.g., determined by the cloud environment). The severity level may include a numerical indicator (e.g., a score between 1 and 5, between 1 and 10, or in another numeric range) and/or a categorical indicator (e.g., a selection between "high," "medium," and "low," among other examples).

In some implementations, the exception system may transmit, and the cloud environment may receive, a request for information associated with the security vulnerability. For example, the request may include an HTTP request, an FTP request, and/or an API call, among other examples. The request may include (e.g., in a header and/or as an argument) an indication of the security vulnerability and/or an indication of a cloud-based application associated with the security vulnerability. Accordingly, the cloud environment may transmit the indication of the security vulnerability in response to the request. The exception system may transmit the request according to a schedule (e.g., once per hour or once per day, among other examples) and/or in response to a command to transmit the request. For example, the user device may transmit, and the exception system may receive, the command, such that the exception system transmits the request in response to the command.

Additionally, or alternatively, the exception system may subscribe to security vulnerability updates from the cloud environment. Accordingly, the cloud environment may transmit indications according to a schedule (e.g., once per hour or once per day, among other examples) and/or as available (e.g., shortly after a new security vulnerability is detected).

Although the example 100 is shown with the cloud environment and the tracking system, other examples may include an intermediary system (e.g., one or more intermediary devices), such as a vulnerability database, that receives and processes information from the cloud environment and/or the tracking system. Accordingly, the exception system may receive the indication of the security vulnerability (and/or the ticket) from the intermediary system. Additionally, or alternatively, the intermediary system may generate additional information (or at least update information) associated with the security vulnerability. Accordingly, the exception system may receive the additional information (or at least the updated information) from the intermediary system.

The processes described in connection with FIGS. 1A and 1B may be combined. For example, the exception system may receive the indication of the security vulnerability from the user device and may receive additional information associated with the security vulnerability from the cloud environment, the tracking system, and/or the intermediary system. In another example, the exception system may receive the indication of the security vulnerability from the tracking system and may receive additional information associated with the security vulnerability from the cloud environment and/or the intermediary system.

Figure 1C:
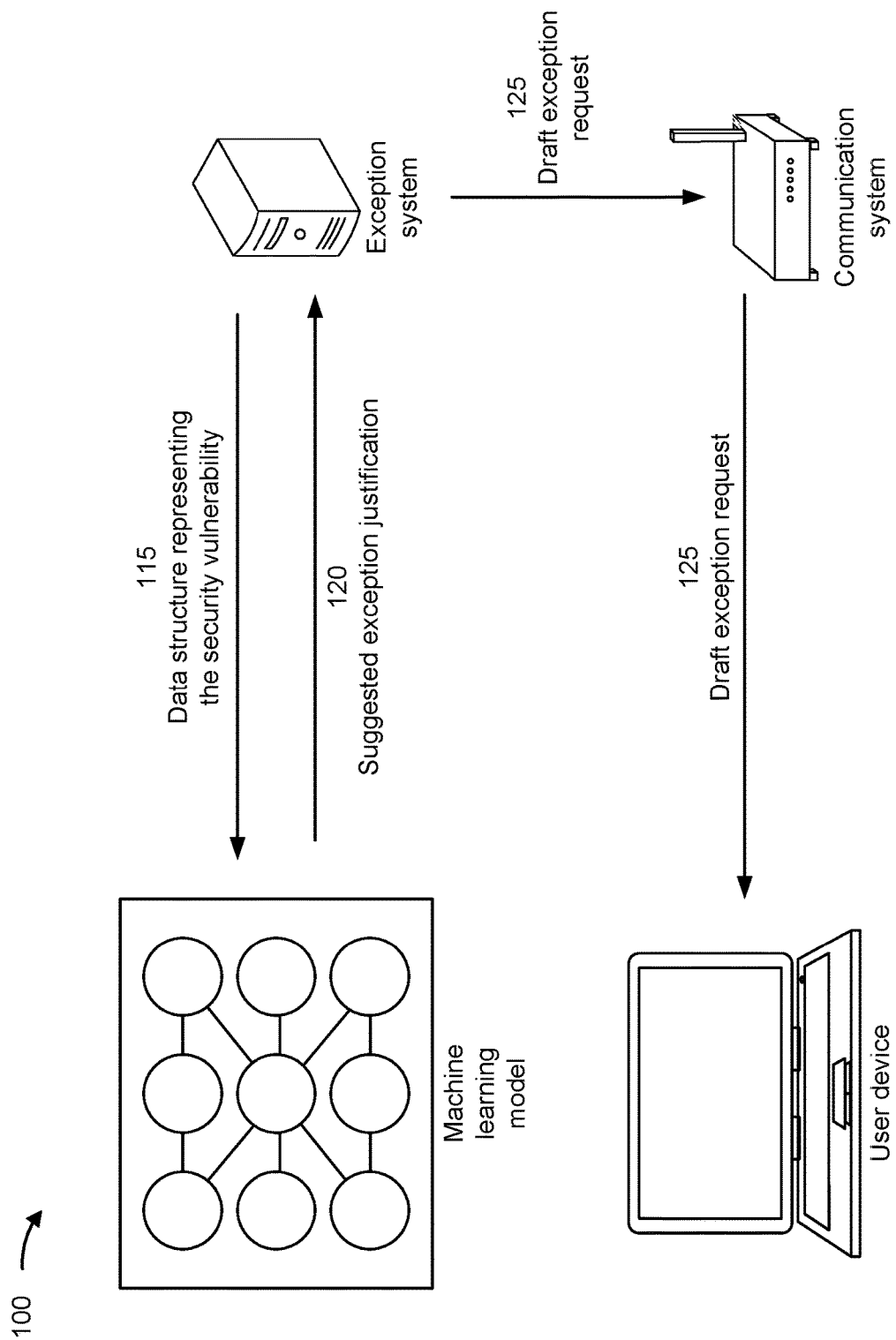

As shown in FIG. 1C and by reference number 115, the exception system may provide a data structure that represents the security vulnerability to the ML model. For example, the exception system may transmit, and the ML host may receive, a request including the data structure. The data structure may represent the ticket associated with the security vulnerability. Additionally, or alternatively, the exception system may combine information from the user device, the cloud environment, the tracking system, and/or the intermediary system in order to generate the data structure. For example, the data structure may include the indication of the security vulnerability along with any additional information associated with the security vulnerability (e.g., received from the cloud environment, the tracking system, and/or the intermediary system).

The ML model may be trained (e.g., by the ML host and/or a device at least partially separate from the ML host) using a labeled set of security vulnerabilities (e.g., for supervised learning). Additionally, or alternatively, the ML model may be trained using an unlabeled set of security vulnerabilities (e.g., for deep learning). The ML model may be configured to determine a suggested exception justification for the security vulnerability (e.g., based on the data structure).

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., information about front-end devices). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the exception system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 120, the exception system may receive the suggested exception justification from the ML model (e.g., from the ML host). For example, the ML model may output a string variable encoding a reason why the security vulnerability should be excepted. In another example, the ML model may output an indication that the security vulnerability should not be excepted. For example, the ML model may output a string variable encoding "N/A," "Not recommended for exception," or another similar indication that the security vulnerability should not be excepted.

As shown by reference number 125, the exception system may transmit, and the user device may receive, a draft exception request including the suggested exception justification. The draft exception request may include a data structure that encodes the indication of the security vulnerability, the suggested exception justification, and optionally additional information associated with the security vulnerability. In some implementations, information from the user device, the cloud environment, the tracking system, and/or the intermediary system may indicate a user assigned to the security vulnerability. Accordingly, the exception system may transmit the draft exception request to the user device based on the user device being associated with the user. For example, the exception system may determine the user device from a database storing a list of registered devices or another similar type of data structure. The database may be implemented in a local storage (e.g., a memory managed by the exception system) or in a storage that is at least partially separate (e.g., physically, logically, and/or virtually) from the exception system. Therefore, the exception system may transmit a query to the database (e.g., included in an HTTP request and/or using an API call) and receive a response to the query (e.g., included in an HTTP response and/or as a return from the API call) that includes an indication of the user device (e.g., a device name, an Internet protocol (IP) address, and/or a MAC address, among other examples).

In some implementations, the draft exception request may further include a suggested expiry date received from the ML model. For example, the ML model may be configured to determine the suggested expiry date for the security vulnerability (e.g., based on clustering the security vulnerability with other excepted security vulnerabilities). The suggested expiry date may be later in time than a due date associated with the security vulnerability (e.g., as indicated by the user device, the cloud environment, the tracking system, and/or the intermediary system. In other words, the ML model may suggest how long the security vulnerability should be excepted from a default due date associated with the security vulnerability (e.g., corresponding to a category associated with the security vulnerability and/or a severity level associated with the security vulnerability).

As further shown by reference number 125, the exception system may transmit, and the user device may receive, the draft exception request via the communication system. For example, the exception system may transmit a message (e.g., a chat message or an email message, among other examples) that includes the draft exception request using the communication system, and the communication system may automatically transmit the draft exception request to the user device.

Figure 1D:
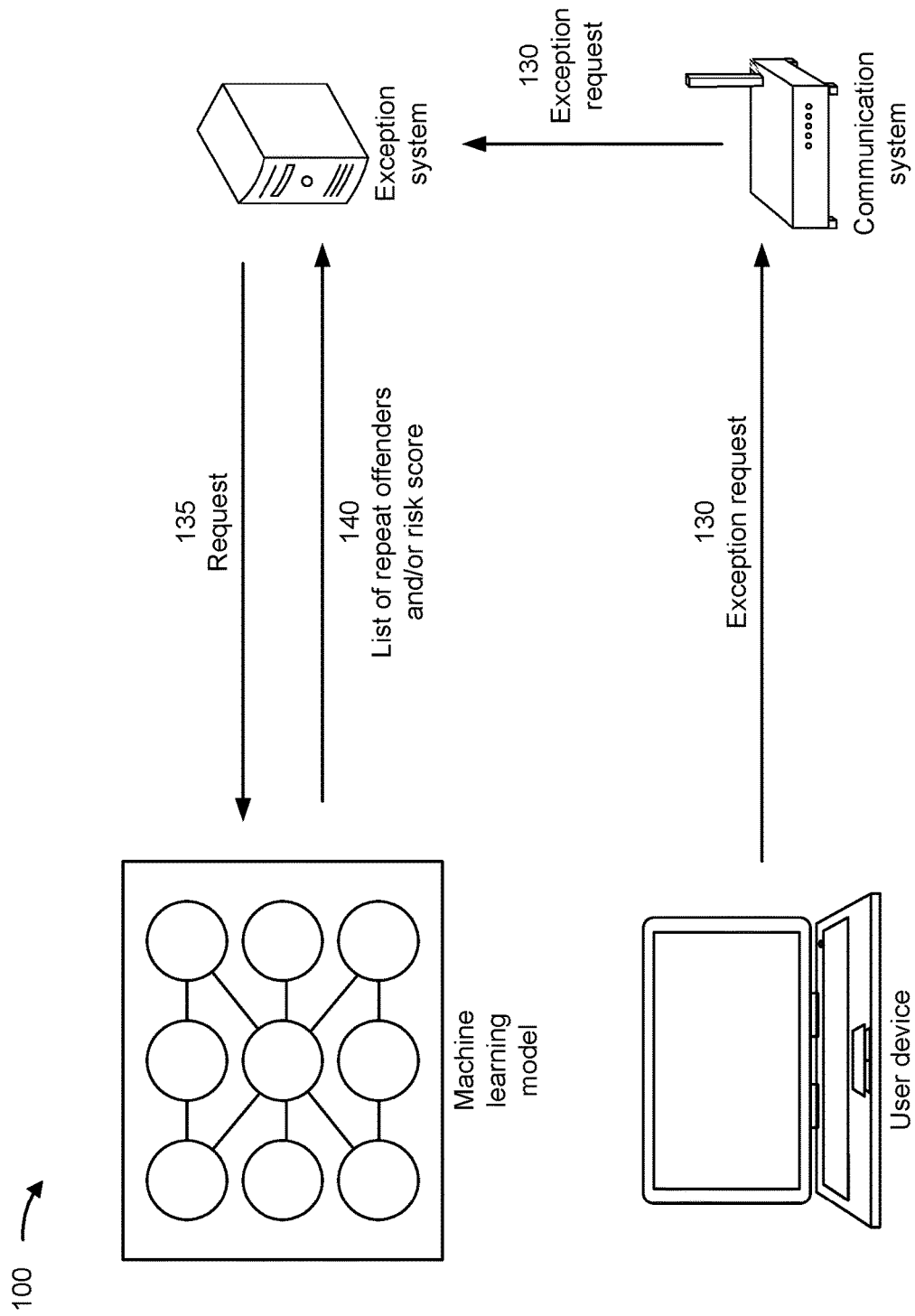

As shown in FIG. 1D and by reference number 130, the user device may transmit, and the exception system may receive, a request to submit an exception request based on the draft exception request. For example, the exception request may include the suggested exception justification (optionally as modified by the user of the user device). Additionally, in some implementations, the exception request may include the suggested expiry date. As further shown by reference number 130, the user device may transmit, and the exception system may receive, the request via the communication system. For example, the user device may transmit a message (e.g., a chat message or an email message, among other examples) that includes the exception request using the communication system, and the communication system may automatically transmit the exception request to the exception system.

In some implementations, the user of the user device may provide input that triggers the user device to transmit the request. For example, a web browser (and/or another type of application executed by the user device) may navigate to a website controlled by (or at least associated with) the communication system. Accordingly, the user may interact with a UI representing the website in order to provide the input to trigger the user device to transmit the request to submit the exception request.

Because the ML model generates the draft exception request, the user may submit the exception request with less input (e.g., because the suggested exception justification and/or the suggested expiry date are already generated). As a result, the user device consumes less power and fewer processing resources than if the user were to have generated the exception request without the draft exception request.

As shown by reference number 135, the exception system may transmit a request to the ML model. For example, the exception system may transmit, and the ML host may receive, the request. The request may include an HTTP request, an FTP request, and/or an API call, among other examples. In some implementations, the request may include (e.g., in a header and/or as an argument) an indication of the security vulnerability.

As shown by reference number 140, the ML model may output the list of repeat offenders. For example, the ML host may transmit, and the exception system may receive, the list of repeat offenders. The ML model may output the list of repeat offenders in response to the request from the exception system.

Although the example 100 is described in connection with the ML model providing the list of repeat offenders, other examples may include a database providing the list of repeat offenders. For example, the database may store the list of repeat offenders as determined by the ML model. The database may be implemented in a local storage (e.g., a memory managed by the exception system) or in a storage that is at least partially separate (e.g., physically, logically, and/or virtually) from the exception system. Therefore, the exception system may transmit a query to the database (e.g., included in an HTTP request and/or using an API call) and receive a response to the query (e.g., included in an HTTP response and/or as a return from the API call) that includes the list of repeat offenders (e.g., a device name, an IP address, and/or a MAC address, among other examples).

Additionally, or alternatively, as further shown by reference number 140, the ML model may output a risk score associated with excepting the security vulnerability. For example, the ML host may transmit, and the exception system may receive, the risk score. In some implementations, the risk score may include an initial score associated with the security vulnerability and an updated score associated with excepting the security vulnerability.

Additionally, or alternatively, the ML model may output an indication of a related security vulnerability (e.g., at least one indication of at least one related security vulnerability). For example, the ML host may transmit, and the exception system may receive, the indication. In some implementations, the indication may include a string value with a name of the related security vulnerability and/or another alphanumeric indicator associated with the related security vulnerability.

Additionally, or alternatively, the ML model may output a recommendation regarding whether to except the security vulnerability. For example, the ML host may transmit, and the exception system may receive, the recommendation. In some implementations, the recommendation may include a binary variable indicating whether to except the security vulnerability (e.g., using a value of '1' or 'TRUE') or not (e.g., using a value of '0' or 'FALSE').

Figure 1E:
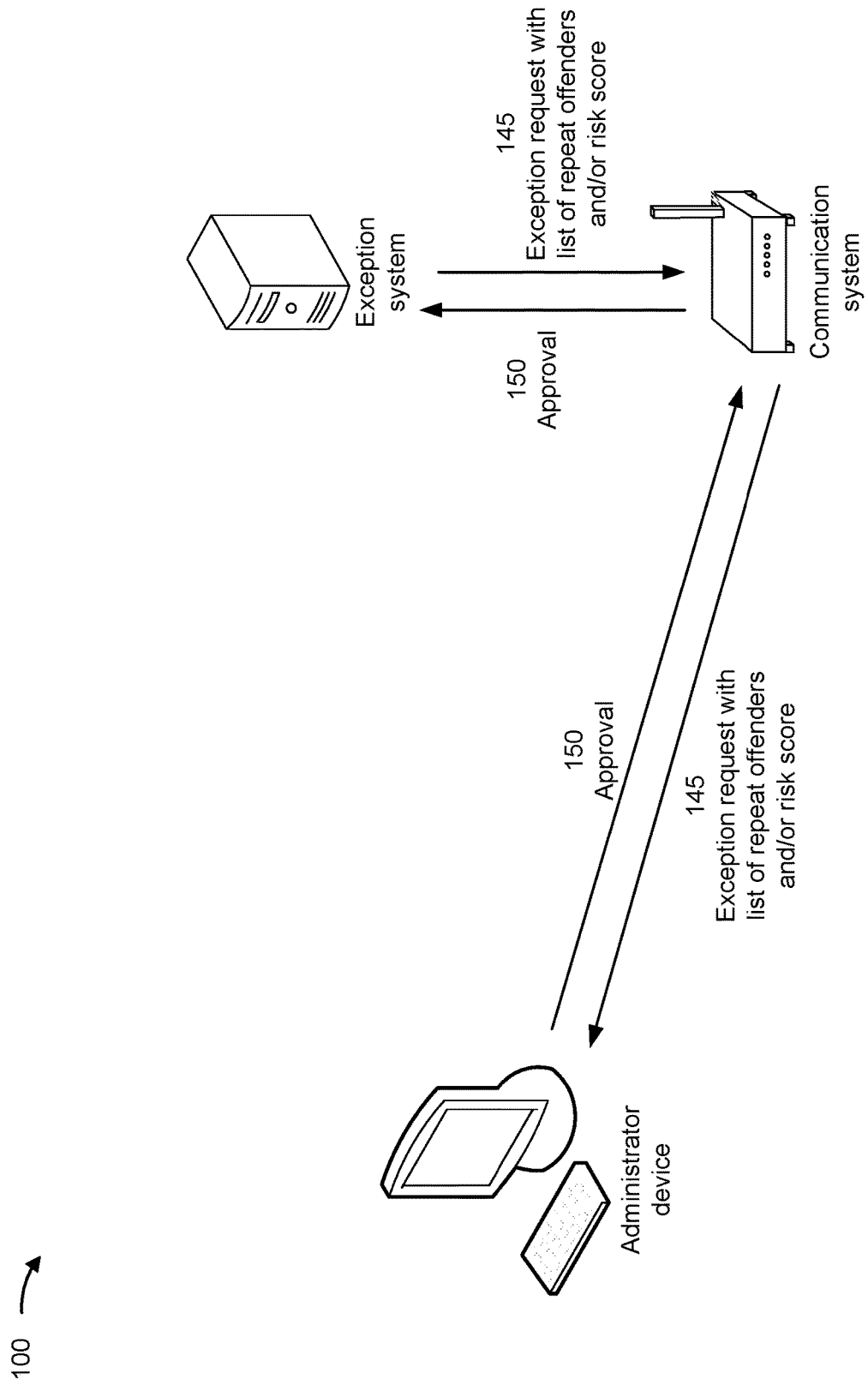

As shown in FIG. 1E and by reference number 145, the exception system may transmit, and the administrator device may receive, the exception request with the list of repeat offenders, the risk score, the indication of the related security vulnerability, and/or the recommendation. In some implementations, information from the user device, the cloud environment, the tracking system, and/or the intermediary system may indicate an administrator assigned to the security vulnerability. Accordingly, the exception system may transmit the draft exception request to the administrator device based on the administrator device being associated with the administrator. For example, the exception system may determine the administrator device from a database storing a list of registered devices or another similar type of data structure. The database may be implemented in a local storage (e.g., a memory managed by the exception system) or in a storage that is at least partially separate (e.g., physically, logically, and/or virtually) from the exception system. Therefore, the exception system may transmit a query to the database (e.g., included in an HTTP request and/or using an API call) and receive a response to the query (e.g., included in an HTTP response and/or as a return from the API call) that includes an indication of the administrator device (e.g., a device name, an IP address, and/or a MAC address, among other examples).

As further shown by reference number 145, the exception system may transmit, and the administrator device may receive, the exception request via the communication system. For example, the exception system may transmit a message (e.g., a chat message or an email message, among other examples) that includes the exception request using the communication system, and the communication system may automatically transmit the exception request to the administrator device. Additionally, or alternatively, the exception system may transmit, and the administrator device may receive, an email message including the exception request and/or a chat message including the exception request.

In some implementations, the exception system may output the exception request in a UI. For example, the exception system may transmit, and the administrator device may receive, instructions for the UI, such that the administrator device may output the UI to the administrator (e.g., via an output component of the administrator device). The UI may be as described in connection with FIG. 2A, FIG. 2B, FIG. 2C, and/or FIG. 2D. In some implementations, the administrator device may output the UI within a larger UI associated with a communication application. For example, the administrator device may execute the communication application to communicate with the communication system, and the exception system may output the exception request via the communication system. Therefore, the communication application may receive the instructions for the UI via the communication system and output the UI including the exception request within the larger UI of the communication application.

As shown by reference number 150, the administrator device may transmit, and the exception system may receive, an approval of the exception request. For example, the approval may include an indication of an interaction with the UI that includes the exception request (e.g., with a button of the UI). As further shown by reference number 150, the administrator device may transmit, and the exception system may receive, the approval via the communication system. For example, the administrator device may transmit a message (e.g., a chat message or an email message, among other examples) that includes the approval using the communication system, and the communication system may automatically transmit the approval to the exception system.

In some implementations, the administrator using the administrator device may provide input that triggers the administrator device to transmit the approval. For example, a web browser (and/or another type of application executed by the user device) may navigate to a website controlled by (or at least associated with) the communication system. Accordingly, the administrator may interact with a UI representing the website in order to provide the input to trigger the administrator device to transmit the approval.

Because the ML model generates the risk score, the recommendation, and/or the indication of the related security vulnerability, the administrator may evaluate the exception request using the risk score, the recommendation, and/or the indication of the related security vulnerability. As a result, the administrator device consumes less power and fewer processing resources than if the administrator were to have evaluated the exception request without the risk score, the recommendation, and/or the indication of the related security vulnerability (e.g., by performing extra research and/or other additional steps).

As shown in FIG. 1F and by reference number 155a, the exception system may transmit, and the tracking system may receive, a command to tag the security vulnerability as excepted. The exception system may transmit, and the tracking system may receive, the command in response to the approval. Therefore, the tracking system may move a due date associated with the ticket (e.g., to a due date indicated in the exception request). Additionally, the tracking system may conserve power and processing resources by refraining from sending reminders to the user device about the excepted security vulnerability.

Additionally, or alternatively, as shown by reference number 155b, the exception system may transmit, and the cloud environment may receive, the command to tag the security vulnerability as excepted. Therefore, the cloud environment may refrain from disabling a cloud-based application associated with the excepted security vulnerability, which improves uptime for the cloud environment.

Although the example 100 is described in connection with approving the exception requests, other examples may include the administrator rejecting the exception request based on the list of repeat offenders. Therefore, because the ML model generates the list of repeat offenders, the administrator may reject abusive exception requests. As a result, security is improved because security vulnerabilities that can (and should be) resolved are not excepted.

By using techniques as described in connection with FIGS. 1A-1F, the ML model generates the draft exception request for the security vulnerability. As a result, the user device consumes less power and fewer processing resources than if the user were to have generated the exception request without the draft exception request. Additionally, the ML model generates the risk score, the recommendation, and/or the indication of the related security vulnerability. As a result, the administrator device consumes less power and fewer processing resources than if the administrator were to have evaluated the exception request without the risk score, the recommendation, and/or the indication of the related security vulnerability.

As indicated above, FIGS. 1A-1F are provided as an example. Other examples may differ from what is described with regard to FIGS. 1A-1F.

FIGS. 2A, 2B, 2C, and 2D are diagrams of example UIs 200, 230, 260, and 290, respectively, associated with an automated vulnerability exception process. The example UIs 200, 230, 260, and/or 290 may be shown by an administrator device (e.g., based on instructions from an exception system). These devices are described in more detail in connection with FIGS. 3 and 4.

Figure 2A:
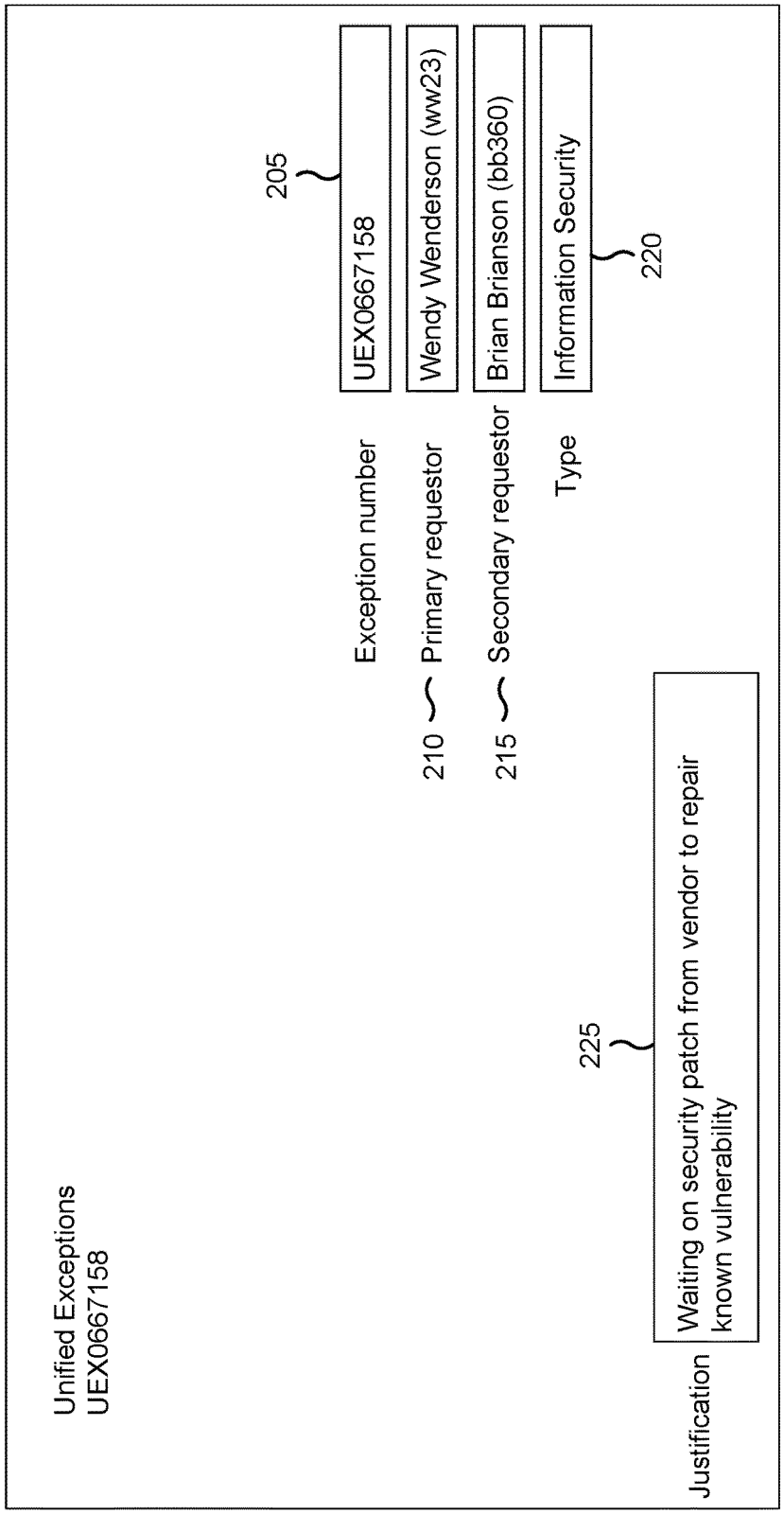

As shown in FIG. 2A, the example UI 200 may indicate an identifier 205 (associated with an exception request and/or a security vulnerability), a primary requestor 210 (e.g., an identifier associated with a user submitting the exception request), a secondary requestor 215 (e.g., an identifier associated with an administrator reviewing the exception request), and/or a category 220 (associated with the exception request and/or the security vulnerability). In some implementations, the example UI 200 may further include an exception justification 225.

Figure 2B:
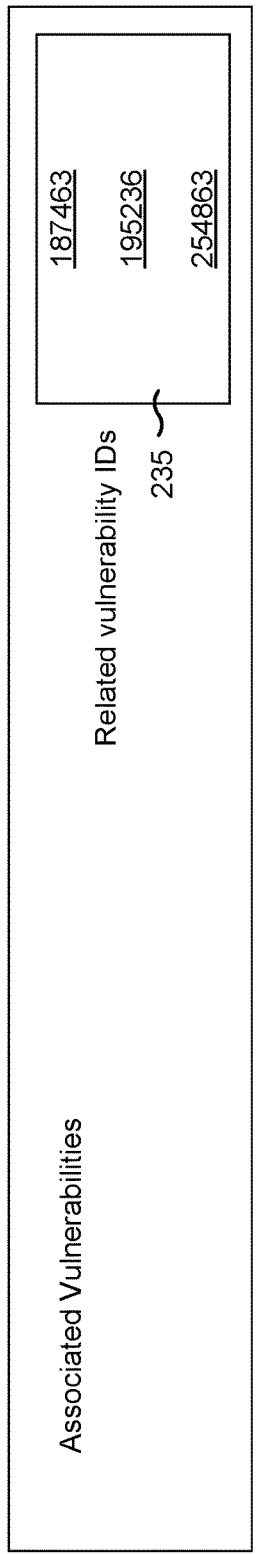

As shown in FIG. 2B, the example UI 230 may indicate a list 235 of related security vulnerabilities. In FIG. 2B, the list 235 includes alphanumeric identifiers associated with the related security vulnerabilities. Other examples may additionally or alternatively include a list of names associated with the related security vulnerabilities.

As shown in FIG. 2C, the example UI 260 may indicate a severity level 265 associated with the security vulnerability, an initial score 270 associated with the security vulnerability, and an updated score 275 associated with excepting the security vulnerability. Therefore, the example UI 260 may include a risk score comprising the initial score 270 and the updated score 275. In some implementations, the example UI 260 may further indicate a recommendation 280 regarding whether to except the security vulnerability.

Figure 2D:
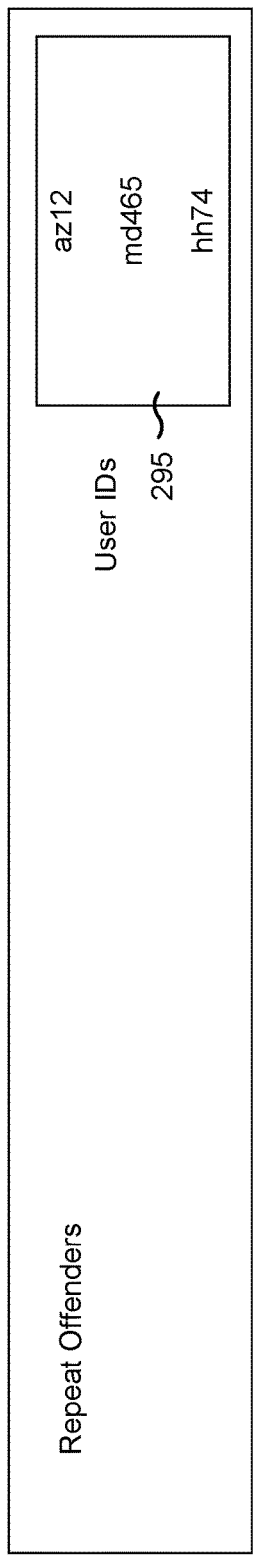

As shown in FIG. 2D, the example UI 290 may indicate a list 295 of repeat offenders. In FIG. 2D, the list 295 includes alphanumeric identifiers associated with users who are repeat offenders. Other examples may additionally or alternatively include a list of names associated with the users.

Two or more of the example UIs 200, 230, 260, or 290 may be combined. For example, elements of the example UIs may be combined into a single UI. Additionally, or alternatively, different example UIs may serve as different tabs within a larger UI. For example, a user may interact with one tab to view the example UI 200 and may interact with another tab to view the example UI 260.

As indicated above, FIGS. 2A-2D are provided as examples. Other examples may differ from what is described with regard to FIGS. 2A-2D. Some examples may omit the secondary requestor 215 in FIG. 2A. Additionally, or alternatively, some examples may include an interactive element, such as a button, that may be used to approve the exception request. Similarly, some examples may include an interactive element, such as a button, that may be used to deny the exception request.

Figure 3:
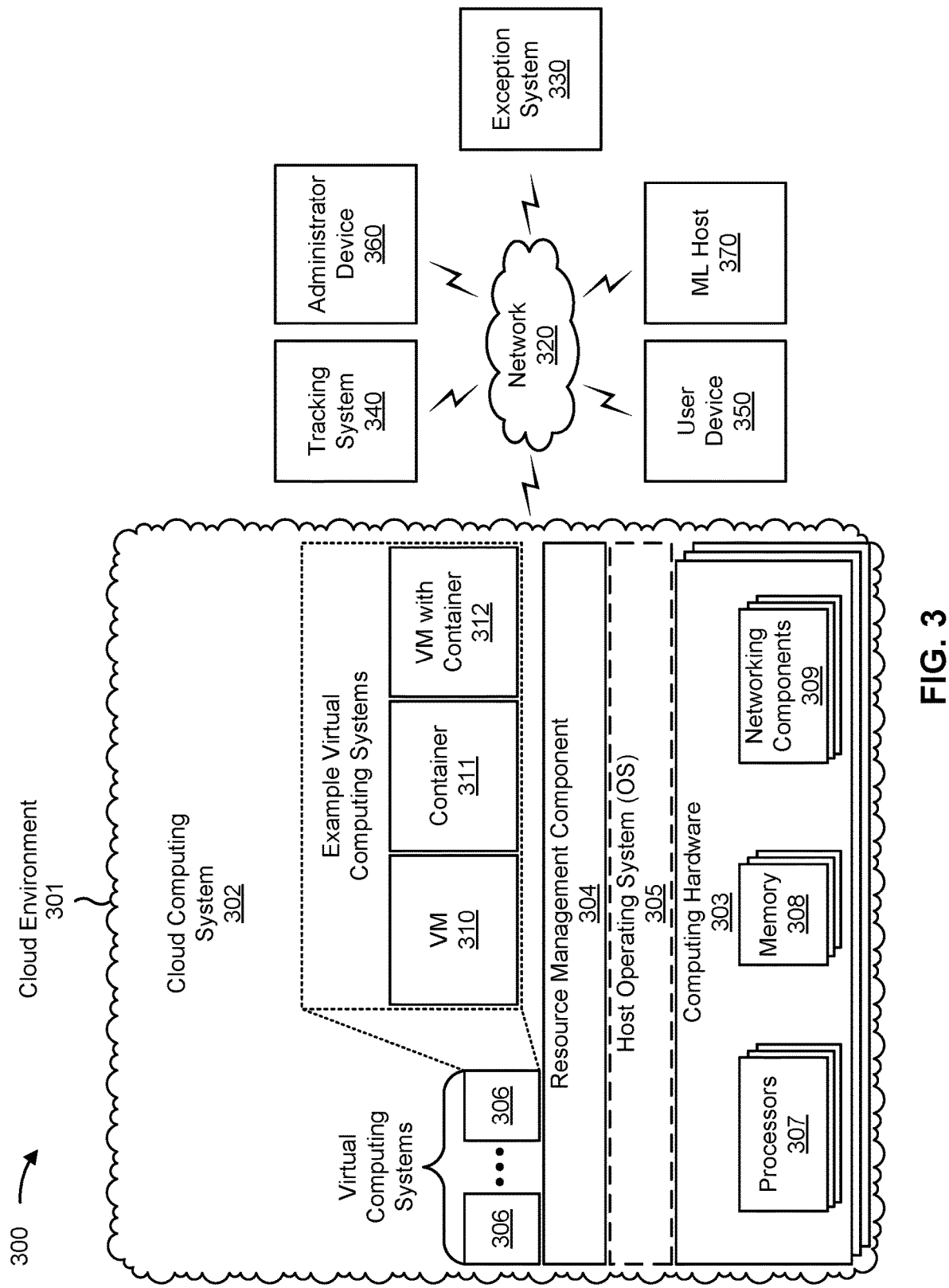
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a cloud environment 301, which may include one or more elements of and/or may execute within a cloud computing system 302. The cloud computing system 302 may include one or more elements 303-312, as described in more detail below. As further shown in FIG. 3, environment 300 may include a network 320, an exception system 330, a tracking system 340, a user device 350, an administrator device 360, and/or an ML host 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the cloud environment 301 may include one or more elements 303-312 of the cloud computing system 302, may execute within the cloud computing system 302, and/or may be hosted within the cloud computing system 302, in some implementations, the cloud environment 301 may not be cloud-based (e.g., may be implemented outside of a cloud computing system) or may be partially cloud-based. For example, the cloud environment 301 may include one or more devices that are not part of the cloud computing system 302, such as device 400 of FIG. 4, which may include a standalone server or another type of computing device. The cloud environment 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The exception system 330 may include one or more devices capable of receiving, generating, storing, processing, providing, and/or routing information associated with exception requests, as described elsewhere herein. The exception system 330 may include a communication device and/or a computing device. For example, the exception system 330 may include a server, such as an application server, a client server, a web server, a database server, a host server, a proxy server, a virtual server (e.g., executing on computing hardware), or a server in a cloud computing system. In some implementations, the exception system 330 may include computing hardware used in a cloud computing environment. For example, the exception system 330 may be at least partially integrated (e.g., virtually, physically, and/or logically) with the cloud environment 301. The exception system 330 may communicate with one or more other devices of environment 300, as described elsewhere herein.

The tracking system 340 may include one or more devices capable of receiving, generating, storing, processing, and/or providing information associated with tickets, as described elsewhere herein. The tracking system 340 may include a communication device and/or a computing device. For example, the tracking system 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The tracking system 340 may include an issue tracking system, such as Jira® or Bugzilla®, among other examples. The tracking system 340 may communicate with one or more other devices of environment 300, as described elsewhere herein.

The user device 350 may include one or more devices capable of receiving, generating, storing, processing, and/or providing information associated with exception requests, as described elsewhere herein. The user device 350 may include a communication device and/or a computing device. For example, the user device 350 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 350 may communicate with one or more other devices of environment 300, as described elsewhere herein.

The administrator device 360 may include one or more devices capable of receiving, generating, storing, processing, and/or providing information associated with exception requests, as described elsewhere herein. The administrator device 360 may include a communication device and/or a computing device. For example, the administrator device 360 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 360 may communicate with one or more other devices of environment 300, as described elsewhere herein.

The ML host 370 may include one or more devices capable of receiving, generating, storing, processing, and/or providing information associated with machine learning models, as described elsewhere herein. The ML host 370 may include a communication device and/or a computing device. For example, the ML host 370 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
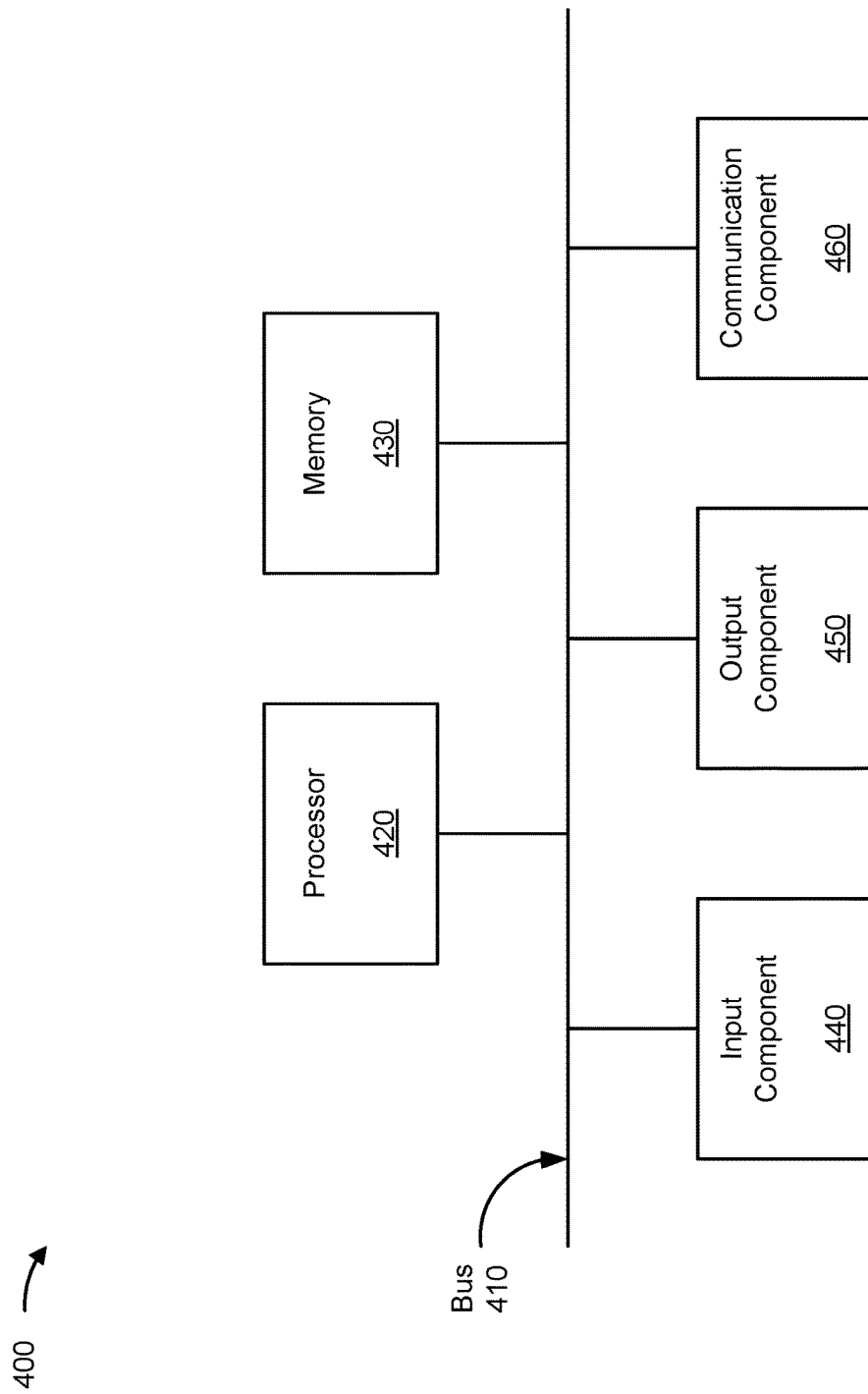
FIG. 4 is a diagram of example components of one or more devices of FIG. 3, in accordance with some embodiments of the present disclosure.

FIG. 4 is a diagram of example components of a device 400 associated with an automated vulnerability exception process. The device 400 may correspond to an exception system 330, a tracking system 340, a user device 350, an administrator device 360, and/or an ML host 370. In some implementations, an exception system 330, a tracking system 340, a user device 350, an administrator device 360, and/or an ML host 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
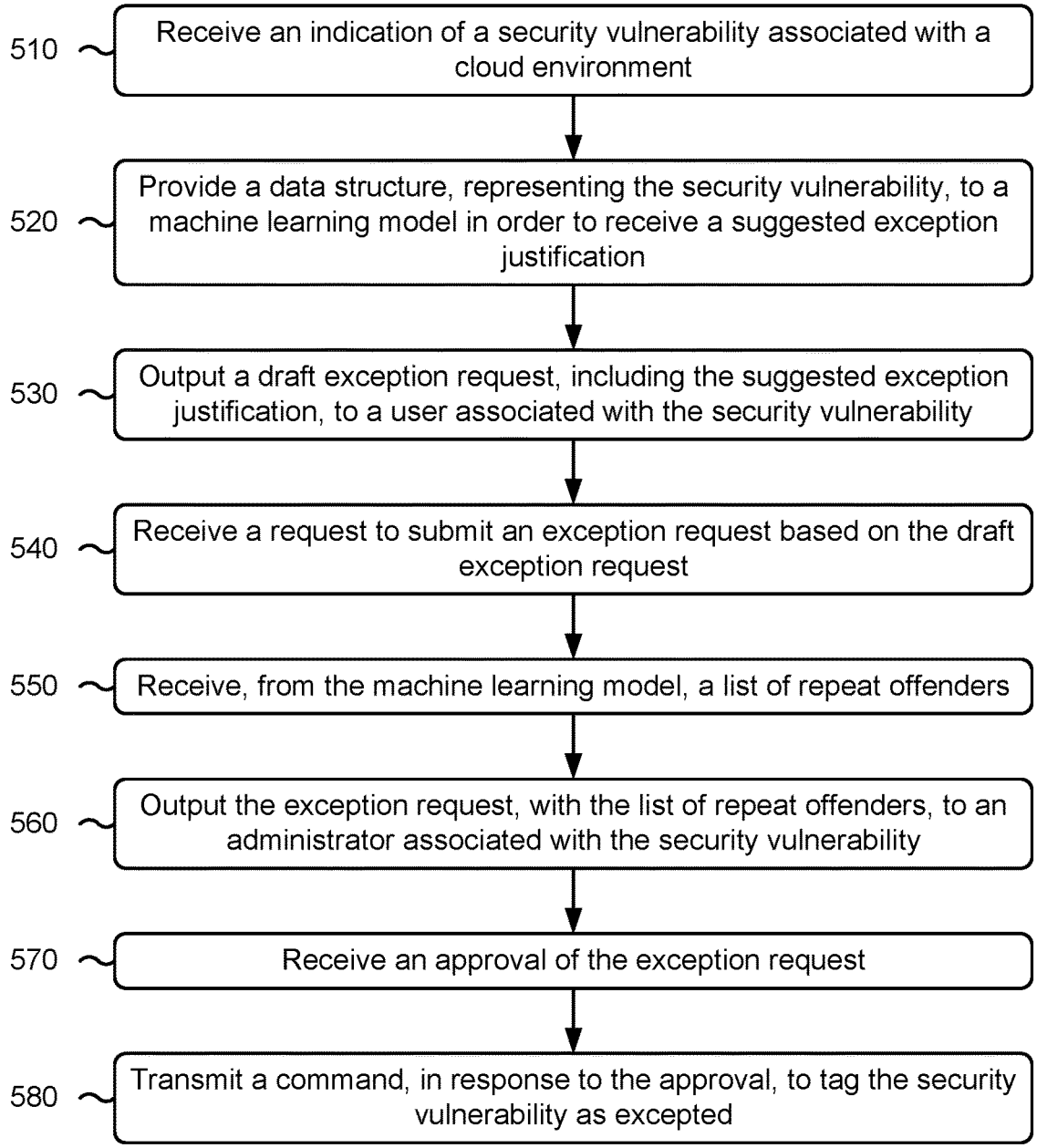
FIG. 5 is a flowchart of an example process relating to an automated vulnerability exception process, in accordance with some embodiments of the present disclosure.

FIG. 5 is a flowchart of an example process 500 associated with an automated vulnerability exception process. In some implementations, one or more process blocks of FIG. 5 may be performed by an exception system 330. In some implementations, one or more process blocks of FIG. 5 may be performed by another device or a group of devices separate from or including the exception system 330, such as a cloud environment 301, a tracking system 340, a user device 350, an administrator device 360, and/or an ML host 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving an indication of a security vulnerability associated with a cloud environment (block 510). For example, the exception system 330 (e.g., using processor 420, memory 430, input component 440, and/or communication component 460) may receive an indication of a security vulnerability associated with a cloud environment, as described above in connection with reference number 105 of FIG. 1A. As an example, the exception system 330 may receive an identifier associated with the security vulnerability. Therefore, the indication of the security vulnerability may be the identifier associated with the security vulnerability. In some implementations, the exception system 330 may receive the indication of the security vulnerability via a communication system.

As further shown in FIG. 5, process 500 may include providing a data structure, representing the security vulnerability, to a machine learning model in order to receive a suggested exception justification (block 520). For example, the exception system 330 (e.g., using processor 420, memory 430, and/or communication component 460) may provide a data structure, representing the security vulnerability, to a machine learning model in order to receive a suggested exception justification, as described above in connection with reference numbers 115 and 120 of FIG. 1C. As an example, the exception system 330 may transmit, and an ML host associated with the machine learning model may receive, a request including the data structure. Therefore, the exception system 330 may receive the suggested exception justification in response to the request. The data structure may represent a ticket associated with the security vulnerability. Additionally, or alternatively, the exception system 330 may combine information from various sources in order to generate the data structure. The machine learning model may be configured to determine the suggested exception justification for the security vulnerability (e.g., based on the data structure).

As further shown in FIG. 5, process 500 may include outputting a draft exception request, including the suggested exception justification, to a user associated with the security vulnerability (block 530). For example, the exception system 330 (e.g., using processor 420, memory 430, output component 450, and/or communication component 460) may output a draft exception request, including the suggested exception justification, to a user associated with the security vulnerability, as described above in connection with reference number 125 of FIG. 1C. As an example, the exception system 330 may transmit a draft exception request, including the suggested exception justification, to a user device associated with the user. The draft exception request may include a data structure that encodes the indication of the security vulnerability, the suggested exception justification, and optionally additional information associated with the security vulnerability. In some implementations, the exception system 330 may transmit the draft exception request via the communication system.

As further shown in FIG. 5, process 500 may include receiving a request to submit an exception request based on the draft exception request (block 540). For example, the exception system 330 (e.g., using processor 420, memory 430, input component 440, and/or communication component 460) may receive a request to submit an exception request based on the draft exception request, as described above in connection with reference number 130 of FIG. 1D. As an example, the exception request may include the suggested exception justification (optionally as modified by the user). Additionally, in some implementations, the exception request may include a suggested expiry date. In some implementations, the exception system 330 may receive the request via the communication system.

As further shown in FIG. 5, process 500 may include receiving, from the machine learning model, a list of repeat offenders (block 550). For example, the exception system 330 (e.g., using processor 420, memory 430, and/or communication component 460) may receive, from the machine learning model, a list of repeat offenders, as described above in connection with reference number 140 of FIG. 1D. As an example, the exception system 330 may receive the list of repeat offenders in response to a request from the exception system 330.

As further shown in FIG. 5, process 500 may include outputting the exception request, with the list of repeat offenders, to an administrator associated with the security vulnerability (block 560). For example, the exception system 330 (e.g., using processor 420, memory 430, and/or output component 450) may output the exception request, with the list of repeat offenders, to an administrator associated with the security vulnerability, as described above in connection with reference number 145 of FIG. 1E. As an example, the exception system 330 may transmit the exception request to an administrator device associated with the administrator. In some implementations, the exception system 330 may transmit the exception request via the communication system.

As further shown in FIG. 5, process 500 may include receiving an approval of the exception request (block 570). For example, the exception system 330 (e.g., using processor 420, memory 430, input component 440, and/or communication component 460) may receive an approval of the exception request, as described above in connection with reference number 150 of FIG. 1E. As an example, the exception system 330 may receive the approval from the administrator device. The approval may include an indication of an interaction with a UI that includes the exception request (e.g., with a button of the UI). In some implementations, the exception system 330 may receive the approval via the communication system.

As further shown in FIG. 5, process 500 may include transmitting a command, in response to the approval, to tag the security vulnerability as excepted (block 580). For example, the exception system 330 (e.g., using processor 420, memory 430, and/or communication component 460) may transmit a command, in response to the approval, to tag the security vulnerability as excepted, as described above in connection with reference number 155a and/or reference number 155b of FIG. 1F. As an example, the exception system 330 may transmit the command to a tracking system. Therefore, the tracking system may move a due date associated with the ticket (e.g., to a due date indicated in the exception request). Additionally, the tracking system may conserve power and processing resources by refraining from sending reminders to the user device about the excepted security vulnerability. Additionally, or alternatively, the exception system 330 may transmit the command to the cloud environment. Therefore, the cloud environment may refrain from disabling a cloud-based application associated with the excepted security vulnerability, which improves uptime for the cloud environment.

Figure 6:
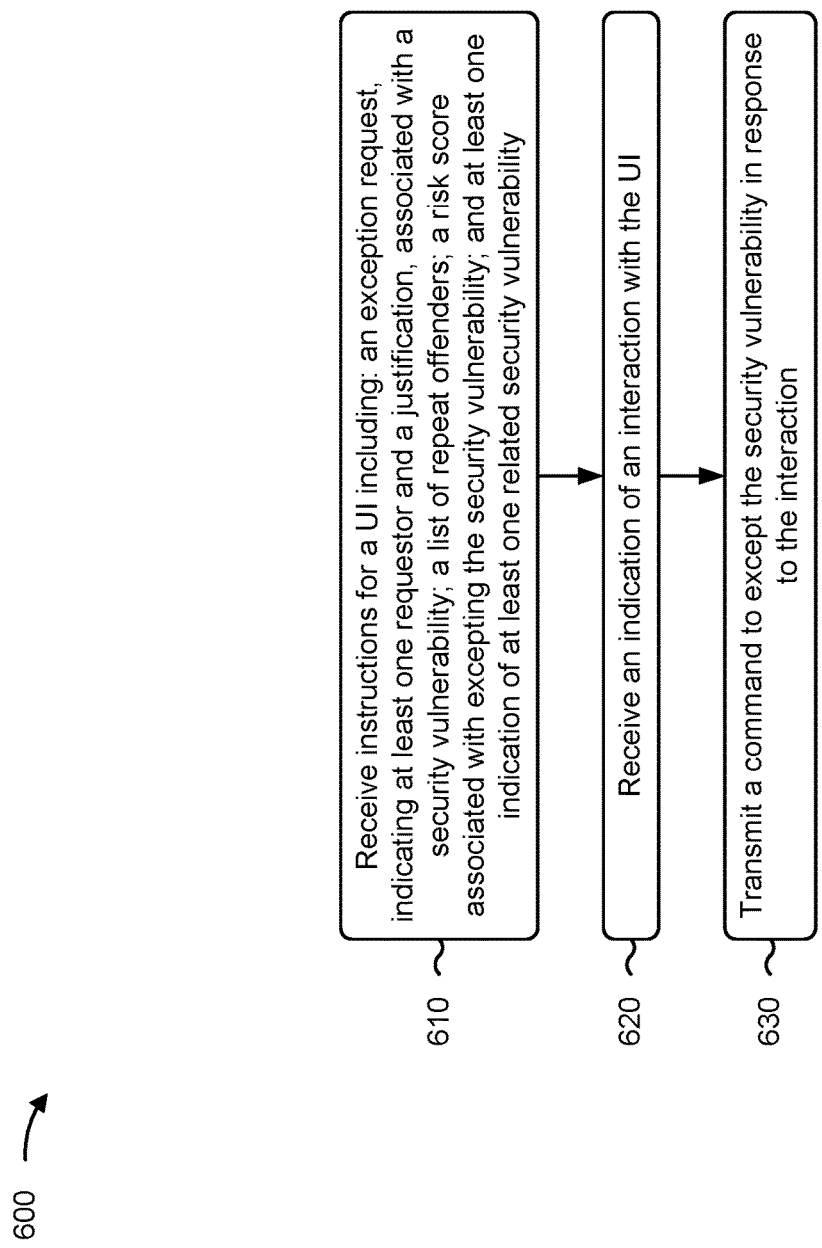
FIG. 6 is a flowchart of an example process relating to UIs for an automated vulnerability exception process, in accordance with some embodiments of the present disclosure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or 2A-2D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures FIG. 6 is a flowchart of an example process 600 associated with UIs for an automated vulnerability exception process. In some implementations, one or more process blocks of FIG. 6 may be performed by an administrator device 360. In some implementations, one or more process blocks of FIG. 6 may be performed by another device or a group of devices separate from or including the administrator device 360, such as a cloud environment 301, an exception system 330, a tracking system 340, a user device 350, and/or an ML host 370. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include receiving instructions for a UI including: an exception request, indicating at least one requestor and a justification, associated with a security vulnerability; a list of repeat offenders; a risk score associated with excepting the security vulnerability; and at least one indication of at least one related security vulnerability (block 610). For example, the administrator device 360 (e.g., using processor 420, memory 430, and/or communication component 460) may receive instructions for a UI, as described above in connection with FIGS. 2A-2D. As an example, the administrator device 360 may output the UI within a larger UI associated with a communication application. For example, the administrator device 360 may execute the communication application to communicate with a communication system, the communication application may receive the instructions for the UI via the communication system, and the administrator device 360 may output the UI within the larger UI of the communication application.

As further shown in FIG. 6, process 600 may include receiving an indication of an interaction with the UI (block 620). For example, the administrator device 360 (e.g., using processor 420, memory 430, input component 440, and/or communication component 460) may receive an indication of an interaction with the UI, as described above in connection with FIG. 1E. As an example, the indication of the interaction may be associated with an interactive element of the UI, such as a button. The interactive element may be associated with approval of the exception request (rather than denial or rejection of the exception request).

As further shown in FIG. 6, process 600 may include transmitting a command to except the security vulnerability in response to the interaction (block 630). For example, the administrator device 360 (e.g., using processor 420, memory 430, and/or communication component 460) may transmit a command to except the security vulnerability in response to the interaction, as described above in connection with reference number 150 of FIG. 1E. As an example, the command may be an approval of the exception request. In some implementations, the administrator device 360 may transmit the command via the communication system.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1F and/or 2A-2D. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automating a vulnerability exception process, the system comprising:
one or more memories; and
one or more processors, communicatively coupled to the one or more memories, configured to:

receive an indication of a security vulnerability associated with a cloud environment;

provide a data structure, representing the security vulnerability, to a machine learning model in order to receive a suggested exception justification;

output a draft exception request, including the suggested exception justification, to a user associated with the security vulnerability;

receive a request to submit an exception request based on the draft exception request;

receive, from the machine learning model, a list of repeat offenders;

output the exception request, with the list of repeat offenders, to an administrator associated with the security vulnerability;

receive an approval of the exception request; and transmit a command, in response to the approval, to tag the security vulnerability as excepted.

2. The system of claim 1, wherein the one or more processors, to receive the indication of the security vulnerability, are configured to:

receive, from a tracking system, a ticket including the indication of the security vulnerability associated with the cloud environment.

3. The system of claim 1, wherein the one or more processors, to receive the indication of the security vulnerability, are configured to:

receive, from the cloud environment, the indication of the security vulnerability.

4. The system of claim 1, wherein the one or more processors are configured to:

receive, from a communication system, an identifier associated with the security vulnerability, wherein the draft exception request is output via the communication system.

5. The system of claim 1, wherein the one or more processors, to output the exception request, are configured to:

output the exception request via a communication system.

6. The system of claim 5, wherein the one or more processors, to receive the approval, are configured to:

receive the approval via the communication system.

7. The system of claim 1, wherein the exception request is further output with a risk score associated with excepting the security vulnerability or at least one indication of at least one related security vulnerability.

8. A method of automating a vulnerability exception process, comprising:

receiving, at an exception system, an indication of a security vulnerability associated with a cloud environment;

providing, by the exception system, a data structure that represents the security vulnerability to a machine learning model in order to receive a suggested exception justification;

outputting, to a user device associated with a user assigned to the security vulnerability, a draft exception request that includes the suggested exception justification;

receiving, from the user device and at the exception system, a request to submit an exception request based on the draft exception request; and transmitting, by the exception system, a command to tag the security vulnerability as excepted.

9. The method of claim 8, further comprising:

outputting, to an administrator device associated with an administrator assigned to the security vulnerability, the exception request; and receiving, from the administrator device and at the exception system, an approval of the exception request, wherein the command is transmitted in response to the approval.

10. The method of claim 9, wherein the exception request is output in an email message.

11. The method of claim 8, wherein the exception request is output in a chat message.

12. The method of claim 8, wherein the draft exception request further includes a suggested expiry date received from the machine learning model.

13. The method of claim 8, further comprising:

receiving, from a vulnerability database, additional information associated with the security vulnerability, wherein the additional information is further provided to the machine learning model.

14. The method of claim 8, further comprising:

receiving, from a communication system, an identifier associated with the security vulnerability, wherein the draft exception request is output via the communication system.

15. A non-transitory computer-readable medium storing a set of instructions for user interfaces (UIs) for a vulnerability exception process, the set of instructions comprising:

one or more instructions that, when executed by one or more processors of a device, cause the device to:

receive instructions for a UI including:

an exception request, indicating at least one requestor and a justification, associated with a security vulnerability;

a list of repeat offenders;

a risk score associated with excepting the security vulnerability; and at least one indication of at least one related security vulnerability;

receive an indication of an interaction with the UI; and transmit a command to except the security vulnerability in response to the interaction.

16. The non-transitory computer-readable medium of claim 15, wherein the risk score includes an initial score associated with the security vulnerability and an updated score associated with excepting the security vulnerability.

17. The non-transitory computer-readable medium of claim 15, wherein the UI further includes a severity level associated with the security vulnerability.

18. The non-transitory computer-readable medium of claim 15, wherein the UI further includes a recommendation regarding whether to except the security vulnerability.

19. The non-transitory computer-readable medium of claim 15, wherein the one or more instructions, when executed by the one or more processors, cause the device to:

output the UI within a larger UI associated with a communication application.

20. The non-transitory computer-readable medium of claim 15, wherein the UI includes a button, and the interaction is with the button.

* * * * *